Oct. 7, 1941.    H. F. VICKERS    2,258,307
POWER TRANSMISSION
Filed Nov. 18, 1938    2 Sheets-Sheet 1

INVENTOR
HARRY F. VICKERS
BY
ATTORNEY

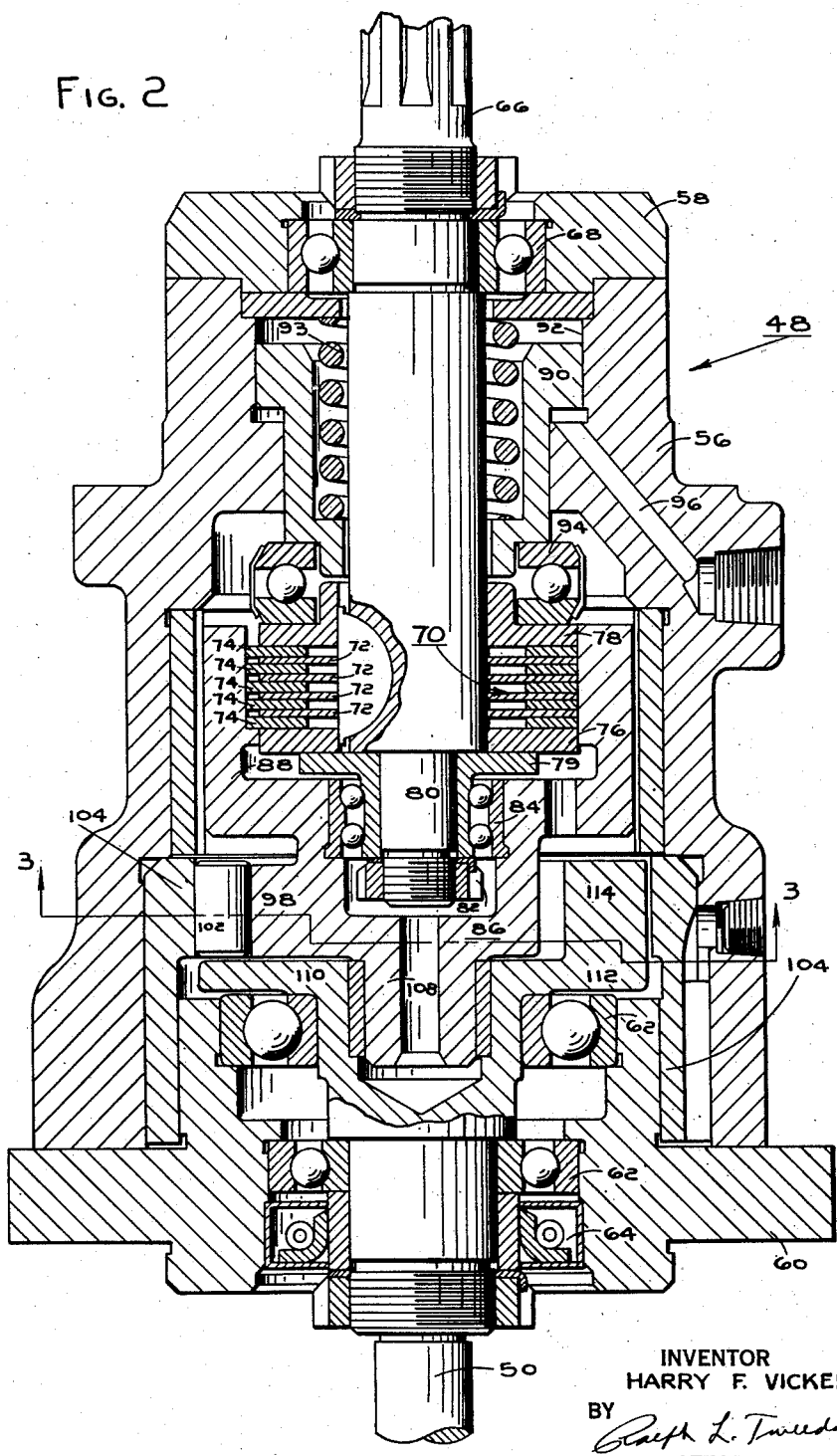

Patented Oct. 7, 1941

2,258,307

UNITED STATES PATENT OFFICE 2,258,307

POWER TRANSMISSION

Harry F. Vickers, Detroit, Mich., assignor to Vickers Incorporated, Detroit, Mich., a corporation of Michigan Application November 18, 1938, Serial No. 241,215

12 Claims. (Cl. 192—3)

This invention relates to power transmissions, particularly to those of the type comprising two or more fluid pressure energy translating devices one of which may function as a pump and another as a fluid motor.

This invention is particularly adapted for transmitting power to a load device such as a hoist or other machine wherein there is a gravity or other load or bias acting in one or the other direction the force of which the power transmission may be required to overcome. In devices of this nature it is sometimes desirable to provide alternative power sources for operating the load device, one of which may be a fluid power transmission system while the other may be a hand drive or other standby operating mechanism. In certain applications it is necessary that the load device be maintained stationary against the force of gravity whenever the load device is not being positively driven from one or the other source of power. It is also desirable that any mechanism analogous to a ratchet for holding the load device stationary be releaseable so as to permit backward movement of the load device and that such release be made automatically whenever power is applied from either source in the reverse direction.

It is an object of the present invention to provide a power transmission system in which the above requirements are satisfied and which is of simple and durable construction and reliable in operation.

A further object is to provide a power transmission system of this character wherein a drive-released brake is associated with the load device together with a drive-released clutch for the purpose of maintaining the load device stationary while permitting positive driving of the same in either direction from either of two power sources.

Further objects and advantages of the present invention will be apparent from the following description, reference being had to the accompanying drawings wherein a preferred form of the present invention is clearly shown.

In the drawings:

Figure 2 is a longitudinal cross section of a drive-released brake and drive-released clutch mechanism incorporated in the mechanism of Figure 1.

Figure 1:
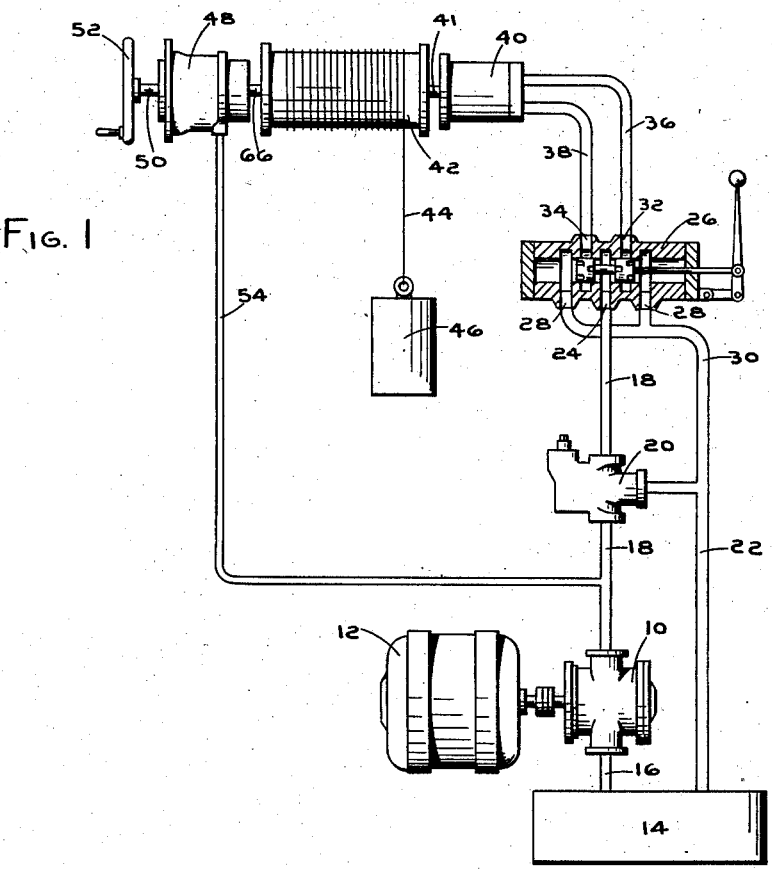
Figure 1 is a diagrammatic view of a power transmission system embodying a preferred form of the present invention.

Referring now to Figure 1, there is illustrated a power transmission system comprising a pump 10 which may be operated by a suitable prime mover such as an electric motor 12 and which draws fluid from a tank 14 through a suction conduit 16 and delivers the same to a delivery conduit 18. A suitable relief valve 20 of conventional construction is provided for bypassing fluid from the line 18 to the tank through a return line 22 whenever the pressure in line 18 exceeds a predetermined safe value. The pressure line 18 extends to the pressure port 24 of an open-center four-way valve 26 of conventional construction, as, for example, the type illustrated in Munger Patent 1,292,013 or Francis Patent 1,716,881. The tank ports 28 of valve 26 connect with the conduit 22 by a conduit 30. The controlled ports 32 and 34 connect by conduits 36 and 38 with a rotary fluid motor 40 which may be of any suitable construction.

The mechanism thus far described is typical of one class of hydraulic power transmission device to which the present invention may be adapted and per se forms no part of the present invention.

The motor 40 is connected by a shaft 41 to drive a load device indicated by the hoist drum 42 on which a cable 44 may be wound or unwound to raise or lower a load indicated diagrammatically at 46. At the opposite side of the drum 42 a brake and clutch unit 48 is connected to the drum by a shaft 66 and has a shaft 50 which connects to a manual power source such as the hand crank 52. A branch conduit 54 connects from the conduit 18 to the unit 48 for a purpose later to be described.

Figure 3:
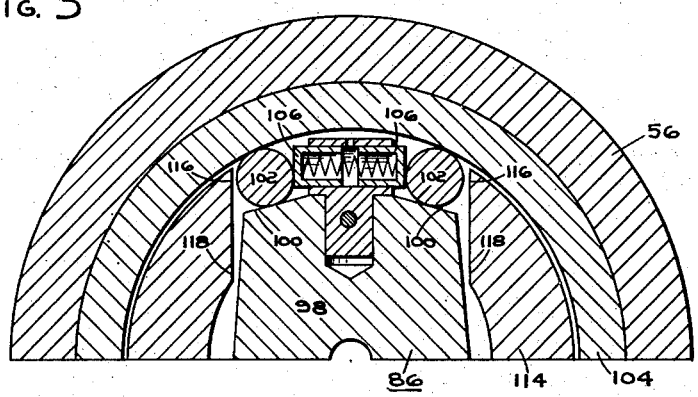
Figure 3 is a cross section on line 3—3 of Figure 2.

Referring now to Figures 2 and 3, the unit 48 comprises a generally cylindrical casing 56 having its ends closed by caps 58 and 60. The shaft 50 projects through the cap 60 in which it is journalled on bearings 62 and is provided with an oil seal 64. The cap 58 carries the shaft 66 journalled on bearings 68. The shaft 66 carries at its inner end a clutch generally designated as 70 which may be of any suitable type and in the present embodiment is shown as a multiple plate friction clutch having a series of plates 72 slidably keyed to the shaft 66 and a series of plates 74 freely rotatable relative to the shaft 66. Suitable pressure plates 76 and 78 are mounted on the shaft 66, the latter being slidable axially thereon and the former being retained thereon by a collar 79 secured to the reduced end 80 of the shaft 66 by a nut 82. The collar 79 also forms an inner race for an anti-friction bearing 84 on which is journalled an intermediate member 86.

The member 86 is provided with a cup-like portion 88 in which the plates 74 are slidably keyed, whereby the shaft 66 may be selectively connected to or disconnected from the intermediate member 86 by axial movement of the pressure plate 78.

For the purpose of shifting the pressure plate 78 a sleeve 90 is slidably mounted in a cylinder 92 formed in the casing 56. The sleeve 90 is pressed downwardly against the pressure plate 78 by a spring 93 and has an anti-friction thrust bearing 94 interposed at its lower end between it and the pressure plate. The lower end of the cylinder 92 forms a pressure chamber to which fluid pressure may be admitted through a conduit 96 which connects with the conduit 54 of Figure 1. Whenever sufficient pressure is admitted to the conduit 96 the sleeve 90 is raised against the force of the spring 93 releasing the clutch 70. When this pressure is relieved, the spring again forces the pressure plate 78 downward engaging the clutch 70.

The intermediate member 86 is provided with a flange portion 98 having cam surfaces 100 thereon (Fig. 3) with which a pair of rollers 102 are adapted to coact. The rollers 102 also engage the inner cylindrical surface of a hardened steel ring 104 rigidly mounted in the casing 56. Suitable spring plungers 106 constantly urge the rollers 102 outwardly into wedging engagement between the cam surfaces 100 and the inner surface of the ring 104, thus constituting a two-way acting roller brake for preventing movement of the intermediate member 86 relative to the casing 56 whenever both rollers are in locking position. The member 86 carries a pilot projection 108 on which is journalled a releasing and driving member 110 formed integrally with the shaft 50. The member 110 comprises a generally circular flange 112 with which is integrally formed an upstanding cup-like portion 114 extending around approximately three-fourths of the periphery of the flange 112. The portion 114 is approximately coextensive in an axial direction with the flange 98 and is provided with toe portions 116 adapted to engage one or the other of the rollers 102 to force the same inwardly against the spring plungers 106 and release them from locking position. The member 114 also has heel portions 118 adapted to abut the sides of the flange portion 98 and cause the latter to be driven by the member 114.

The mechanism centering around the flange 98, rollers 102, ring 104, and member 114 represents one type of drive-released brake suitable for use in the present invention, although it will be understood that other equivalent types of construction performing the same function may be used with equal facility. This drive-released brake mechanism functions to maintain the intermediate member 86 locked to the casing 56 at all times except when the shaft 50 is rotated to release the locking engagement of either of the rollers 102 and by further movement, engaging the flange 98 at the heel portion 118, to positively drive the same in either direction.

In operation, with the parts in the position illustrated in Figure 1, fluid is delivered by the pump 10 through the conduit 18 and is bypassed back to the tank 14 through the open-center valve 26 and conduits 30 and 22. Under these conditions fluid circulates through this path at substantially no pressure. It will be noted also that the fluid motor 40 is likewise bypassed should the same be caused to operate for any reason.

The load device 42, being directly connected to shaft 66, is held stationary by the engagement of clutch 70 which connects shaft 66 with the intermediate member 86 which is locked to the ring 104 and casing 56 by the rollers 102. The clutch 70 is maintained in engagement, of course, because of the lack of pressure in conduits 54 and 96 whereby the spring 93 forces the sleeve 90 downwardly in Figure 2 to press the clutch plates 72 and 74 together.

If it is desired to drive the load device in the direction tending to raise the load 46, the valve 26 may be shifted, say, to the right causing the motor 40 to rotate in the direction winding in the cable 44. As soon as the valve is shifted, the pump 10 is no longer bypassed and pressure builds up in the conduit 18 and branches 54 and 96 causing the sleeve 90 to raise, releasing the clutch 70 and thus disconnecting shaft 66 from the intermediate member 86. The motor 40 can then drive the drum 42.

If a resisting load is applied to the motor shaft, the pressure in conduit 18 will be exactly proportional to the magnitude of that load resistance. It is this latter fact which is utilized for the purpose of making the clutch 70 release in response to the application of a given driving effort. Thus the clutch 70 can never be released until a predetermined driving effort is applied at the motor 40. During lowering operation the load 46 tends to drive the motor 40 in the lowering direction which tendency is resisted, however, by the clutch 70 which locks the shaft 66 to the intermediate member 98 which in turn is locked to the stationary ring 104. Thus with the clutch 70 engaged, the motor shaft 41 is effectively locked to the stationary part of the mechanism. Accordingly, when pressure fluid is admitted to conduit 38 for reverse operation of motor 40, the latter cannot turn immediately, and since the oil being delivered by pump 10 must have somewhere to go, pressure immediately builds up in conduits 18, 38 and 54. This rise in pressure is determined by the degree of resistance to rotation imposed at shaft 41. Thus the pressure will rise until the clutch spring 93 is overcome sufficiently to permit shaft 41 to turn under the torque exerted by motor 40 at that particular hydraulic pressure.

When the valve 26 is again shifted to its center position the pump is again bypassed and the pressure in lines 18, 54, and 96 falls so that sleeve 90 is again moved down to engage the clutch 70. This provides a strong braking action causing the load device to stop almost instantly without substantial over travel.

Should it be desired to rotate the load device 42 in the opposite direction, the valve 26 is shifted to the left to cause reverse rotation of the motor 40. Under these conditions, even though the gravity pull of load 46 be sufficient to cause reverse movement of drum 42 independently of the motor 40, it is necessary that the clutch 70 be released before such movement can occur. This resistance to turning imposed by clutch 70 causes pressure to build up in the line 18 sufficient to at least partly raise the sleeve 90 to relieve the pressure on the pressure plate 78 until a point is reached where the clutch 70 will begin to slip although still providing enough braking effect to maintain this pressure in the conduit 18.

It will be obvious that a condition of equilibrium is reached such that the braking effect or drag of the clutch 70 is just sufficient to produce the required load on the motor 40 for maintaining enough pressure in the line 18 to hold the clutch 70 released by this amount. In stopping after movement in the reverse direction the same braking effect is again produced at clutch 70.

If the valve 26 be maintained at its center position with the pump 10 and the motor 40 bypassed, or if the hydraulic transmission system be disabled for any reason, the load device may be operated by means of the hand crank 52. Under these conditions no pressure will exist in the conduits 54 and 96 so that the clutch 70 will be fully engaged by the action of spring 93. When the shaft 50 is thus turned, one of the toes 116 will engage its roller 102 to force the same inwardly out of wedging engagement and either permit the load device to rotate in an unwinding direction under the urge of the load 46 or, if the hand wheel be turned in a raising direction, the continued movement of member 114 will engage the heel 118 with the flange 98, thus forming a positive driving connection at this point.

It will be seen that the present invention provides a power transmission system wherein the load device is always locked against movement in either direction by any external force applied to or by the load device and yet complete freedom of movement in either direction is permitted whenever power is applied from either the fluid motor 40 or the hand wheel 52. It will be understood that the advantages of the present invention may also be derived without the two-way action at the drive-released brake mechanism.

While the form of embodiment of the invention, as herein disclosed, constitutes a preferred form, it is to be understood that other forms might be adopted, all coming within the scope of the claims which follow.

What is claimed is as follows:

1. In a power transmission system for driving a load device from either of two power sources, the combination with a shaft connected to the load device and to one of said power sources of a drive-released brake having its driving end connected to the other power source, a clutch connected between the driven end of the brake and said shaft, means for disengaging the clutch whenever power is applied from the first mentioned power source, and means engaging the clutch automatically when driving from the first power source is discontinued.

2. In a power transmission system for driving a load device in either direction and from either of two power sources the combination with a shaft connected to the load device and to one of said power sources, of a two-way drive-released brake having its driving end connected to the other power source, a clutch connected between the driven end of the brake and said shaft, means for disengaging the clutch whenever power is applied from the first mentioned power source, and means engaging the clutch automatically when driving from the first power source is discontinued.

3. In a power transmission system for driving a load device from either of two power sources, one of which is a fluid motor, the combination with a shaft connected to the load device and to said fluid motor, of a drive-released brake having its driving end connected to the other power source, a clutch connected between the driven end of the brake and said shaft, fluid pressure responsive means for disengaging the clutch whenever power is applied from said fluid motor, and means engaging the clutch automatically when driving from said fluid motor is discontinued.

4. In a power transmission system for driving a load device in either direction and from either of two power sources, one of which is a fluid motor, the combination with a shaft connected to the load device and to said fluid motor of a two-way drive-released brake having its driving end connected to the other power source, a clutch connected between the driven end of the brake and said shaft, fluid pressure responsive means for disengaging the clutch whenever power is applied from said fluid motor, and means engaging the clutch automatically when driving from said fluid motor is discontinued.

5. In a power transmission system for driving a load device from either of two power sources, one of which is a fluid motor, the combination with a shaft connected to the load device and to said fluid motor of a drive-released brake having its driving end connected to the other power source, a clutch connected between the driven end of the brake and said shaft, fluid pressure responsive means for disengaging the clutch whenever power is applied from said fluid motor, means engaging the clutch automatically when driving from said fluid motor is discontinued, and means for bypassing the fluid motor when driving is discontinued therefrom.

6. In a power transmission system for driving a load device from either of two power sources the combination of a drive-released brake and a clutch connected in series relation between one of said power sources and the load device, and means connecting the other power source to the load device independently of said clutch, said brake being connected for release by one of said power sources and the clutch being connected for release by the other power source.

7. In a power transmission system for driving a load device in either direction from either of two power sources the combination of a two-way drive-released brake and clutch connected in series relation between one of said power sources and the load device, and means connecting the other power source to the load device independently of said clutch, said brake being connected for release by one of said power sources and the clutch being connected for release by the other power source.

8. In a power transmission system for driving a load device from either of two power sources, one of which is a fluid motor, the combination of a drive-released brake and a clutch connected in series relation between one of said power sources and the load device, and means connecting the other power source to the load device independently of said clutch, said brake being connected for release by one of said power sources and the clutch being connected for release by said fluid motor.

9. In a power transmission system for driving a load device from either of two power sources, one of which is a fluid motor, the combination of a drive-released brake and a clutch connected in series relation between one of said power sources and the load device, means connecting the other power source to the load device independently of said clutch, said brake being connected for release by one of said power sources and the clutch being connected for release by said fluid motor, and means for bypassing the fluid motor when driving is discontinued therefrom.

10. In a power transmission system for driving a load device from either a fluid motor or a hand crank the combination of an intermediate member, automatic means for locking the intermediate member against movement, means operated by the hand crank for releasing the locking means and driving the intermediate member, releasable means for connecting the intermediate member to the load device and fluid motor, and means responsive to a driving effort imparted to the fluid motor for releasing the last mentioned means.

11. In a power transmission system for driving a load device from either a fluid motor or a hand crank the combination of means for locking the load device against movement, means operated by the hand crank for releasing said locking means and driving the load device, and means controlled by the fluid motor for disconnecting the load device from the locking means whenever the fluid motor is energized with a tendency to drive the load device.

12. In a power transmission system for driving a load device from either of two power sources the combination of means for locking the load device against movement, and means selectively operable by either power source and responsive to the application of power to either source for releasing the locking means.

HARRY F. VICKERS.